US011657410B2

(12) United States Patent
Garg et al.

(10) Patent No.: US 11,657,410 B2
(45) Date of Patent: May 23, 2023

(54) METHOD, SYSTEM, AND COMPUTER PROGRAM PRODUCT FOR WAIT TIME ESTIMATION USING PREDICTIVE MODELING

(71) Applicant: Visa International Service Association, San Francisco, CA (US)

(72) Inventors: Richa Garg, Mountain View, CA (US); Walker Carlson, San Diego, CA (US); Varun Sharma, Foster City, CA (US); Nandakumar Kandaloo, Mountain View, CA (US); Srijoy Aditya, Los Altos, CA (US)

(73) Assignee: Visa International Service Association, San Francisco, CA (US)

( * ) Notice: Subject to any disclaimer, the term of this patent is extended or adjusted under 35 U.S.C. 154(b) by 163 days.

(21) Appl. No.: 16/954,599

(22) PCT Filed: Dec. 20, 2017

(86) PCT No.: PCT/US2017/067530
§ 371 (c)(1),
(2) Date: Jun. 17, 2020

(87) PCT Pub. No.: WO2019/125426
PCT Pub. Date: Jun. 27, 2019

(65) Prior Publication Data
US 2020/0334592 A1      Oct. 22, 2020

(51) Int. Cl.
*G06Q 30/0202*        (2023.01)
*G06N 20/00*          (2019.01)
(Continued)

(52) U.S. Cl.
CPC ....... *G06Q 30/0202* (2013.01); *G06F 18/214* (2023.01); *G06N 20/00* (2019.01);
(Continued)

(58) Field of Classification Search
None
See application file for complete search history.

(56) References Cited

U.S. PATENT DOCUMENTS 4,700,295 A * 10/1987 Katsof ................... G07C 11/00
377/6
7,778,937 B2 * 8/2010 Ferrara .................. G06Q 30/02
705/304

(Continued)

FOREIGN PATENT DOCUMENTS

| JP | 2009295102 A | 12/2009 |
| JP | 2017501513 A | 1/2017 |
| JP | 6200041 B1 | 9/2017 |

OTHER PUBLICATIONS

Visa international service association secures patent on lines prediction model. (Jun. 30, 2020). Global IP News.Information Technology Patent News Retrieved from https://dialog.proquest.com/professional/docview/2419018837?accountid=131444 (Year: 2020).*

*Primary Examiner* — Folashade Anderson
(74) *Attorney, Agent, or Firm* — The Webb Law Firm

(57) ABSTRACT

Described are a system, method, and computer program product for generating and applying a predictive wait time estimate using predictive modeling. The method includes receiving initial transaction data representative of a plurality of transactions between a plurality of transaction accounts and at least one merchant. The method also includes generating, for each subinterval, training data including at least one of the following: service rate during the subinterval, number of transactions during the subinterval, total transaction value during the subinterval, mean transaction value during the subinterval, year, month, day of week, or any combination thereof. The method further includes generating a predictive model that generates an output of arrival rate for an input of at least one time parameter. The method (Continued)

further includes generating the predictive wait time estimate for a designated time.

18 Claims, 4 Drawing Sheets

(51) Int. Cl.
    *G06Q 10/04*     (2023.01)
    *G06Q 20/40*     (2012.01)
    *G06Q 30/0207*     (2023.01)
    *G06Q 30/0251*     (2023.01)
    *G06F 18/214*     (2023.01)

(52) U.S. Cl.
    CPC ............ *G06Q 10/04* (2013.01); *G06Q 20/40* (2013.01); *G06Q 30/0207* (2013.01); *G06Q 30/0251* (2013.01)

(56) References Cited

U.S. PATENT DOCUMENTS

| | | | |
|---|---|---|---|
| 9,671,203 B1 * | 6/2017 | Lee | F42C 19/0823 |
| 9,671,230 B2 | 6/2017 | Sahay et al. | |
| 10,755,097 B2 * | 8/2020 | Hayashi | G07G 1/0036 |
| 11,144,907 B2 * | 10/2021 | Singhai | H04W 4/60 |
| 2014/0180848 A1 * | 6/2014 | Argue | G07G 1/14 |
| | | | 705/16 |
| 2015/0127431 A1 * | 5/2015 | Thomas | G06Q 10/06393 |
| | | | 705/7.39 |
| 2016/0148092 A1 | 5/2016 | Chauhan | |
| 2016/0189154 A1 | 6/2016 | Eramian et al. | |
| 2016/0314482 A1 * | 10/2016 | Basu | G06Q 30/0251 |
| 2017/0083850 A1 * | 3/2017 | Crow | G06F 16/2477 |
| 2018/0176311 A1 * | 6/2018 | Sharma | H04L 67/535 |
| 2018/0225615 A1 * | 8/2018 | Thomas | G06Q 10/0633 |
| 2022/0101214 A1 * | 3/2022 | Bansal | G06N 7/005 |

* cited by examiner

METHOD, SYSTEM, AND COMPUTER PROGRAM PRODUCT FOR WAIT TIME ESTIMATION USING PREDICTIVE MODELING

CROSS-REFERENCE TO RELATED APPLICATION

This application is the United States national phase of International Application No. PCT/US2017/067530 filed Dec. 20, 2017, the disclosure of which is hereby incorporated by reference in its entirety.

BACKGROUND

1. Technical Field

Disclosed embodiments relate generally to a system, method, and computer program product for generating and applying a predictive wait time estimate using predictive modeling, and in some non-limiting embodiments or aspects, to a system, method, and computer program product for generating predictive wait time estimates by applying predictive modeling to historic transaction data.

2. Technical Considerations

In systems of computer-monitored service and wait times, it may be convenient to base the analysis on popular queuing theory, and when analyzing merchants with a single point of service, the M/M/1 model seems like a good fit. However, this assumption is inaccurate and inefficient. Traditional queueing theory assumes constant/regular service rates (e.g., people serviced per unit time) and arrival rates (e.g., people arriving per unit time). However, this realistically does not occur for merchants in practical operation. For one, arrival rates of customers can considerably change depending on any number of factors, including time of day, season, type of merchant, and/or the like. By way of example, a restaurant might be more crowded during certain time periods for breakfast, lunch, and dinner, while coffee shops may experience heavier traffic during the morning and afternoon. Furthermore, although service rate, e.g., the number of people serviced per unit time, may largely remain a constant—as it is it is not probable for the speed of a person serving to vary extremely—it can still vary. Thus, applying traditional queuing theory by itself is inadequate for accurate, consistent, and efficient computer-driven predictive modeling.

There is a need in the art for a wait estimation model that does not require direct observation of customer arrivals, departures, and services. There is further a need in the art for a system to monitor predictive wait times and automatically notify users or merchants when wait time estimates meet or pass predetermined thresholds.

SUMMARY

Accordingly, and generally, provided is an improved system, computer-implemented method, and computer program product for generating and applying a predictive wait time estimate using predictive modeling. Provided is a system, computer-implemented method, and computer program product for receiving transaction data representative of a plurality of transactions during a sample time period and generating training data based at least partially on the transaction data. Provided is a system, computer-implemented method, and computer program product for generating a predictive model that generates an output of arrival rate for at least one time parameter and generating the predictive wait time estimate for a designated time.

According to some non-limiting embodiments or aspects, provided is a computer-implemented method for generating and applying a predictive wait time estimate using predictive modeling. The method includes receiving, with at least one processor, initial transaction data representative of a plurality of transactions between a plurality of transaction accounts and at least one merchant completed during a sample time period. The initial transaction data includes, for each transaction of the plurality of transactions, a transaction time and a transaction value. The method also includes generating, with at least one processor and based at least partially on the initial transaction data, for each subinterval of the sample time period, training data including at least one of the following: service rate (e.g., people serviced per unit time) during the subinterval, number of transactions during the subinterval, total transaction value during the subinterval, mean transaction value during the subinterval, year, month, day of week, or any combination thereof. The method further includes generating, with at least one processor and based at least partially on the training data of the sample time period, a predictive model that generates an output of arrival rate (e.g., people arriving per unit time) for an input including at least one time parameter. The method further includes generating, with at least one processor and using the predictive model, the predictive wait time estimate for a designated time. The predictive wait time estimate is at least partially based on the relationship of a queue length at the designated time to the service rate at the designated time. The queue length at the designated time is determined at least partially by an initial queue length at a start time and differences in the arrival rate and the service rate for each subinterval from the start time to the designated time.

In some non-limiting embodiments or aspects, the method may include receiving, with at least one processor, input of the designated time from a display device of a transaction account holder or a merchant. The method may also include, in response to receiving the input of the designated time, transmitting, with at least one processor, the generated predictive wait time estimate to the display device for presentation. The method may further include transmitting to the display device, with at least one processor, a plurality of merchants including the at least one merchant for presentation and selection. The method may further include receiving, with at least one processor, from the display device a selection of the at least one merchant.

In some non-limiting embodiments or aspects, the designated time is a current time, and the method may include receiving, with at least one processor, new transaction data representative of one or more transactions between one or more transaction accounts and the at least one merchant completed during a time interval preceding up to the current time. The new transaction data may include, for each transaction of the one or more transactions, a transaction time and a transaction value. The method may also include generating, with at least one processor, the service rate based at least partially on a relationship of a total transaction value during the time interval preceding up to the current time to a mean transaction value for the time interval preceding up to the current time. The method may further include receiving at predetermined intervals, with at least one processor, new transaction data representative of one or more transactions between one or more transaction accounts and the at least one merchant completed during a new sample time period.

The new transaction data may include for each transaction of the one or more transactions, a transaction time and a transaction value. The method may further include re-generating, with at least one processor and based at least partially on the new transaction data, the training data, the predictive model, and the predictive wait time estimate.

In some non-limiting embodiments or aspects, the method may include, in response to determining that the predictive wait time estimate is greater than or equal to a predetermined threshold wait time for the at least one merchant, generating and transmitting, with at least one processor, a communication to at least one transaction account holder including an offer for a reduced service or product price for the at least one merchant. The method may also include, in response to determining that the predictive wait time estimate is greater than or equal to a predetermined threshold wait time for the at least one merchant, generating and transmitting, with at least one processor, a communication to at least one merchant system including an alert configured to cause the at least one merchant system to take action to increase its corresponding service rate. The method may further include, in response to determining that the predictive wait time estimate is less than or equal to a predetermined minimum wait time for the at least one merchant, generating and transmitting, with at least one processor, a communication to at least one transaction account holder including an advertisement for the at least one merchant.

According to some non-limiting embodiments or aspects, provided is a system for generating and applying a predictive wait time estimate using predictive modeling. The system includes at least one server computer including at least one processor, the at least one server computer programmed and/or configured to receive initial transaction data representative of a plurality of transactions between a plurality of transaction accounts and at least one merchant completed during a sample time period. The initial transaction data includes, for each transaction of the plurality of transactions, a transaction time and a transaction value. The server computer is also programmed and/or configured to generate, based at least partially on the initial transaction data, for each subinterval of the sample time period, training data including at least one of the following: service rate during the subinterval, number of transactions during the subinterval, total transaction value during the subinterval, mean transaction value during the subinterval, year, month, day of week, or any combination thereof. The server computer is further programmed and/or configured to generate, based at least partially on the training data of the sample time period, a predictive model that generates an output of arrival rate for an input including at least one time parameter. The server computer is further programmed and/or configured to generate, using the predictive model, the predictive wait time estimate for a designated time. The predictive wait time estimate is at least partially based on the relationship of a queue length at the designated time to the service rate at the designated time. The queue length at the designated time is determined at least partially by an initial queue length at a start time and differences in the arrival rate and the service rate for each subinterval from the start time to the designated time.

In some non-limiting embodiments or aspects, the at least one server computer may be programmed and/or configured to receive input of the designated time from a display device of a transaction account holder or a merchant. The at least one server computer may also be programmed and/or configured to, in response to receiving the input of the designated time, transmit the generated predictive wait time estimate to the display device for presentation. The at least one server computer may be further programmed and/or configured to transmit to the display device a plurality of merchants including the at least one merchant for presentation and selection. The at least one server computer may be further programmed and/or configured to receive from the display device a selection of the at least one merchant.

In some non-limiting embodiments or aspects, the designated time may be a current time. The at least one server computer may be programmed and/or configured to receive new transaction data representative of one or more transactions between one or more transaction accounts and the at least one merchant completed during a time interval preceding up to the current time. The new transaction data may include, for each transaction of the one or more transactions, a transaction time and a transaction value. The at least one server computer may also be programmed and/or configured to generate the service rate based at least partially on a relationship of a total transaction value during the time interval preceding up to the current time to a mean transaction value for the time interval preceding up to the current time. The at least one server computer may be further programmed and/or configured to receive at predetermined intervals new transaction data representative of one or more transactions between one or more transaction accounts and the at least one merchant completed during a new sample time period. The new transaction data may include, for each transaction of the one or more transactions, a transaction time and a transaction value. The at least one server computer may be further programmed and/or configured to re-generate, based at least partially on the new transaction data, the training data, the predictive model, and the predictive wait time estimate.

In some non-limiting embodiments or aspects, the at least one server computer may be programmed and/or configured to, in response to determining that the predictive wait time estimate is greater than or equal to a predetermined threshold wait time for the at least one merchant, generate and transmit a communication to at least one transaction account holder including an offer for a reduced service or product price for the at least one merchant. The at least one server computer may also be programmed and/or configured to, in response to determining that the predictive wait time estimate is greater than or equal to a predetermined threshold wait time for the at least one merchant, generate and transmit a communication to at least one merchant system including an alert configured to cause the at least one merchant system to take action to increase its corresponding service rate. The at least one server computer may be further programmed and/or configured to, in response to determining that the predictive wait time estimate is less than or equal to a predetermined minimum wait time for the at least one merchant, generate and transmit a communication to at least one transaction account holder including an advertisement for the at least one merchant.

According to some non-limiting embodiments or aspects, provided is a computer program product for generating and applying a predictive wait time estimate using predictive modeling. The computer program product includes at least one non-transitory computer-readable medium including program instructions that, when executed by at least one processor, cause the at least one processor to receive initial transaction data representative of a plurality of transactions between a plurality of transaction accounts and at least one merchant completed during a sample time period. The initial transaction data includes, for each transaction of the plurality of transactions, a transaction time and a transaction value. The program instructions further cause the at least one processor to generate, based at least partially on the initial transaction data, for each subinterval of the sample time period, training data including at least one of the following: service rate during the subinterval, number of transactions during the subinterval, total transaction value during the subinterval, mean transaction value during the subinterval, year, month, day of week, or any combination thereof. The program instructions further cause the at least one processor to generate, based at least partially on the training data of the sample time period, a predictive model that generates an output of arrival rate for an input including at least one time parameter. The program instructions further cause the at least one processor to generate, using the predictive model, the predictive wait time estimate for a designated time. The predictive wait time estimate is at least partially based on the relationship of a queue length at the designated time to the service rate at the designated time. The queue length at the designated time is determined at least partially by an initial queue length at a start time and differences in the arrival rate and the service rate for each subinterval from the start time to the designated time.

In some non-limiting embodiments or aspects, the program instructions may further cause the at least one processor to receive input of the designated time from a display device of a transaction account holder or a merchant. The program instructions may further cause the at least one processor to, in response to receiving the input of the designated time, transmit the generated predictive wait time estimate to the display device for presentation. The program instructions may further cause the at least one processor to transmit to the display device a plurality of merchants including the at least one merchant for presentation and selection. The program instructions may further cause the at least one processor to receive from the display device a selection of the at least one merchant.

In some non-limiting embodiments or aspects, the designated time may be a current time, and the program instructions may further cause the at least one processor to receive new transaction data representative of one or more transactions between one or more transaction accounts and the at least one merchant completed during a time interval preceding up to the current time. The new transaction data may include, for each transaction of the one or more transactions, a transaction time and a transaction value. The program instructions may further cause the at least one processor to generate the service rate based at least partially on a relationship of a total transaction value during the time interval preceding up to the current time to a mean transaction value for the time interval preceding up to the current time. The program instructions may further cause the at least one processor to receive at predetermined intervals new transaction data representative of one or more transactions between one or more transaction accounts and the at least one merchant completed during a new sample time period. The new transaction data may include, for each transaction of the one or more transactions, a transaction time and a transaction value. The program instructions may further cause the at least one processor to re-generate, based at least partially on the new transaction data, the training data, the predictive model, and the predictive wait time estimate.

In some non-limiting embodiments or aspects, the program instructions may further cause the at least one processor to, in response to determining that the predictive wait time estimate is greater than or equal to a predetermined threshold wait time for the at least one merchant, generate and transmit a communication to at least one transaction account holder including an offer for a reduced service or product price for the at least one merchant. The program instructions may further cause the at least one processor to, in response to determining that the predictive wait time estimate is greater than or equal to a predetermined threshold wait time for the at least one merchant, generate and transmit a communication to at least one merchant system including an alert configured to cause the at least one merchant system to take action to increase its corresponding service rate. The program instructions may further cause the at least one processor to, in response to determining that the predictive wait time estimate is less than or equal to a predetermined minimum wait time for the at least one merchant, generate and transmit a communication to at least one transaction account holder including an advertisement for the at least one merchant.

Other non-limiting embodiments or aspects of the present disclosure will be set forth in the following numbered clauses:

Clause 1: A computer-implemented method for generating and applying a predictive wait time estimate using predictive modeling, the method comprising: receiving, with at least one processor, initial transaction data representative of a plurality of transactions between a plurality of transaction accounts and at least one merchant completed during a sample time period, the initial transaction data comprising, for each transaction of the plurality of transactions, a transaction time and a transaction value; generating, with at least one processor and based at least partially on the initial transaction data, for each subinterval of the sample time period, training data comprising at least one of the following: service rate during the subinterval, number of transactions during the subinterval, total transaction value during the subinterval, mean transaction value during the subinterval, year, month, day of week, or any combination thereof; generating, with at least one processor and based at least partially on the training data of the sample time period, a predictive model that generates an output of arrival rate for an input comprising at least one time parameter; and generating, with at least one processor and using the predictive model, the predictive wait time estimate for a designated time, wherein the predictive wait time estimate is at least partially based on the relationship of a queue length at the designated time to the service rate at the designated time, and wherein the queue length at the designated time is determined at least partially by an initial queue length at a start time and differences in the arrival rate and the service rate for each subinterval from the start time to the designated time.

Clause 2: The method of clause 1, further comprising: receiving, with at least one processor, input of the designated time from a display device of a transaction account holder or a merchant; and in response to receiving the input of the designated time, transmitting, with at least one processor, the generated predictive wait time estimate to the display device for presentation.

Clause 3: The method of clause 1 or 2, further comprising: transmitting to the display device, with at least one processor, a plurality of merchants comprising the at least one merchant for presentation and selection; and receiving, with at least one processor, from the display device a selection of the at least one merchant.

Clause 4: The method of any of clauses 1-3, wherein the designated time is a current time, the method further comprising: receiving, with at least one processor, new transaction data representative of one or more transactions between one or more transaction accounts and the at least one merchant completed during a time interval preceding up to the current time, the new transaction data comprising, for each transaction of the one or more transactions, a transaction time and a transaction value; and generating, with at least one processor, the service rate based at least partially on a relationship of a total transaction value during the time interval preceding up to the current time to a mean transaction value for the time interval preceding up to the current time.

Clause 5: The method of any of clauses 1-4, further comprising: receiving at predetermined intervals, with at least one processor, new transaction data representative of one or more transactions between one or more transaction accounts and the at least one merchant completed during a new sample time period, the new transaction data comprising, for each transaction of the one or more transactions, a transaction time and a transaction value; and re-generating, with at least one processor and based at least partially on the new transaction data, the training data, the predictive model, and the predictive wait time estimate.

Clause 6: The method of any of clauses 1-5, further comprising, in response to determining that the predictive wait time estimate is greater than or equal to a predetermined threshold wait time for the at least one merchant, generating and transmitting, with at least one processor, a communication to at least one transaction account holder comprising an offer for a reduced service or product price for the at least one merchant.

Clause 7: The method of any of clauses 1-6, further comprising, in response to determining that the predictive wait time estimate is greater than or equal to a predetermined threshold wait time for the at least one merchant, generating and transmitting, with at least one processor, a communication to at least one merchant system comprising an alert configured to cause the at least one merchant system to take action to increase its corresponding service rate.

Clause 8: The method of any of clauses 1-7, further comprising, in response to determining that the predictive wait time estimate is less than or equal to a predetermined minimum wait time for the at least one merchant, generating and transmitting, with at least one processor, a communication to at least one transaction account holder comprising an advertisement for the at least one merchant.

Clause 9: A system for generating and applying a predictive wait time estimate using predictive modeling, the system comprising at least one server computer including at least one processor, the at least one server computer programmed and/or configured to: receive initial transaction data representative of a plurality of transactions between a plurality of transaction accounts and at least one merchant completed during a sample time period, the initial transaction data comprising, for each transaction of the plurality of transactions, a transaction time and a transaction value; generate, based at least partially on the initial transaction data, for each subinterval of the sample time period, training data comprising at least one of the following: service rate during the subinterval, number of transactions during the subinterval, total transaction value during the subinterval, mean transaction value during the subinterval, year, month, day of week, or any combination thereof; generate, based at least partially on the training data of the sample time period, a predictive model that generates an output of arrival rate for an input comprising at least one time parameter; and generate, using the predictive model, the predictive wait time estimate for a designated time, wherein the predictive wait time estimate is at least partially based on the relationship of a queue length at the designated time to the service rate at the designated time, and wherein the queue length at the designated time is determined at least partially by an initial queue length at a start time and differences in the arrival rate and the service rate for each subinterval from the start time to the designated time.

Clause 10: The system of clause 9, the at least one server computer further programmed and/or configured to: receive input of the designated time from a display device of a transaction account holder or a merchant; and in response to receiving the input of the designated time, transmit the generated predictive wait time estimate to the display device for presentation.

Clause 11: The system of clause 9 or 10, the at least one server computer further programmed and/or configured to: transmit to the display device a plurality of merchants comprising the at least one merchant for presentation and selection; and receive from the display device a selection of the at least one merchant.

Clause 12: The system of any of clauses 9-11, wherein the designated time is a current time, the at least one server computer further programmed and/or configured to: receive new transaction data representative of one or more transactions between one or more transaction accounts and the at least one merchant completed during a time interval preceding up to the current time, the new transaction data comprising, for each transaction of the one or more transactions, a transaction time and a transaction value; and generate the service rate based at least partially on a relationship of a total transaction value during the time interval preceding up to the current time to a mean transaction value for the time interval preceding up to the current time.

Clause 13: The system of any of clauses 9-12, the at least one server computer further programmed and/or configured to: receive at predetermined intervals new transaction data representative of one or more transactions between one or more transaction accounts and the at least one merchant completed during a new sample time period, the new transaction data comprising, for each transaction of the one or more transactions, a transaction time and a transaction value; and re-generate, based at least partially on the new transaction data, the training data, the predictive model, and the predictive wait time estimate.

Clause 14: The system of any of clauses 9-13, the at least one server computer further programmed and/or configured to, in response to determining that the predictive wait time estimate is greater than or equal to a predetermined threshold wait time for the at least one merchant, generate and transmit a communication to at least one transaction account holder comprising an offer for a reduced service or product price for the at least one merchant.

Clause 15: The system of any of clauses 9-14, the at least one server computer further programmed and/or configured to, in response to determining that the predictive wait time estimate is greater than or equal to a predetermined threshold wait time for the at least one merchant, generate and transmit a communication to at least one merchant system comprising an alert configured to cause the at least one merchant system to take action to increase its corresponding service rate.

Clause 16: The system of any of clauses 9-15, the at least one server computer further programmed and/or configured to, in response to determining that the predictive wait time estimate is less than or equal to a predetermined minimum wait time for the at least one merchant, generate and transmit a communication to at least one transaction account holder comprising an advertisement for the at least one merchant.

Clause 17: A computer program product for generating and applying a predictive wait time estimate using predictive modeling, the computer program product comprising at least one non-transitory computer-readable medium including program instructions that, when executed by at least one processor, cause the at least one processor to: receive initial transaction data representative of a plurality of transactions between a plurality of transaction accounts and at least one merchant completed during a sample time period, the initial transaction data comprising, for each transaction of the plurality of transactions, a transaction time and a transaction value; generate, based at least partially on the initial transaction data, for each subinterval of the sample time period, training data comprising at least one of the following: service rate during the subinterval, number of transactions during the subinterval, total transaction value during the subinterval, mean transaction value during the subinterval, year, month, day of week, or any combination thereof; generate, based at least partially on the training data of the sample time period, a predictive model that generates an output of arrival rate for an input comprising at least one time parameter; and generate, using the predictive model, the predictive wait time estimate for a designated time, wherein the predictive wait time estimate is at least partially based on the relationship of a queue length at the designated time to the service rate at the designated time, and wherein the queue length at the designated time is determined at least partially by an initial queue length at a start time and differences in the arrival rate and the service rate for each subinterval from the start time to the designated time.

Clause 18: The computer program product of clause 17, wherein the program instructions further cause the at least one processor to: receive input of the designated time from a display device of a transaction account holder or a merchant; and in response to receiving the input of the designated time, transmit the generated predictive wait time estimate to the display device for presentation.

Clause 19: The computer program product of clause 17 or 18, wherein the program instructions further cause the at least one processor to: transmit to the display device a plurality of merchants comprising the at least one merchant for presentation and selection; and receive from the display device a selection of the at least one merchant.

Clause 20: The computer program product of any of clauses 17-19, wherein the designated time is a current time, and wherein the program instructions further cause the at least one processor to: receive new transaction data representative of one or more transactions between one or more transaction accounts and the at least one merchant completed during a time interval preceding up to the current time, the new transaction data comprising, for each transaction of the one or more transactions, a transaction time and a transaction value; and generate the service rate based at least partially on a relationship of a total transaction value during the time interval preceding up to the current time to a mean transaction value for the time interval preceding up to the current time.

Clause 21: The computer program product of any of clauses 17-20, wherein the program instructions further cause the at least one processor to: receive at predetermined intervals new transaction data representative of one or more transactions between one or more transaction accounts and the at least one merchant completed during a new sample time period, the new transaction data comprising, for each transaction of the one or more transactions, a transaction time and a transaction value; and re-generate, based at least partially on the new transaction data, the training data, the predictive model, and the predictive wait time estimate.

Clause 22: The computer program product of any of clauses 17-21, wherein the program instructions further cause the at least one processor to, in response to determining that the predictive wait time estimate is greater than or equal to a predetermined threshold wait time for the at least one merchant, generate and transmit a communication to at least one transaction account holder comprising an offer for a reduced service or product price for the at least one merchant.

Clause 23: The computer program product of any of clauses 17-22, wherein the program instructions further cause the at least one processor to, in response to determining that the predictive wait time estimate is greater than or equal to a predetermined threshold wait time for the at least one merchant, generate and transmit a communication to at least one merchant system comprising an alert configured to cause the at least one merchant system to take action to increase its corresponding service rate.

Clause 24: The computer program product of any of clauses 17-23, wherein the program instructions further cause the at least one processor to, in response to determining that the predictive wait time estimate is less than or equal to a predetermined minimum wait time for the at least one merchant, generate and transmit a communication to at least one transaction account holder comprising an advertisement for the at least one merchant.

These and other features and characteristics of the present disclosure, as well as the methods of operation and functions of the related elements of structures and the combination of parts and economies of manufacture, will become more apparent upon consideration of the following description, and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular forms of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments that are illustrated in the accompanying figures, in which.

DETAILED DESCRIPTION

Figure 1:
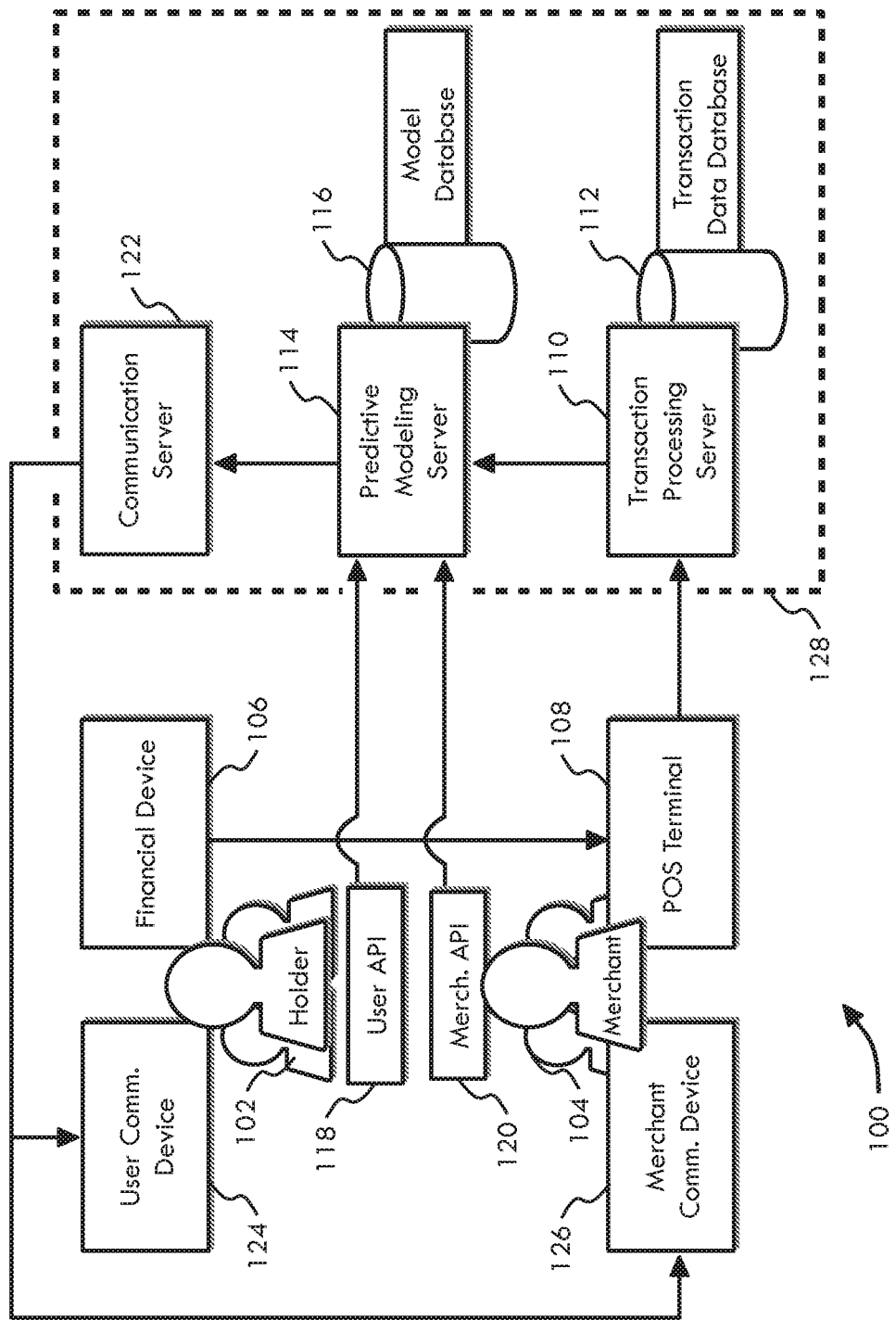
FIG. 1 is a schematic diagram of some non-limiting embodiments or aspects of a system and method for generating and applying a predictive wait time estimate using predictive modeling.

For purposes of the description hereinafter, the terms "upper," "lower," "right," "left," "vertical," "horizontal,"

"top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments of the disclosure. Hence, specific dimensions and other physical characteristics related to the embodiments disclosed herein are not to be considered as limiting. Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

As used herein, the term "transaction service provider" may refer to an entity that receives transaction authorization requests from merchants or other entities and provides guarantees of payment, in some cases through an agreement between the transaction service provider and an issuer institution. The terms "transaction service provider" and "transaction service provider system" may also refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

As used herein, the term "issuer institution" may refer to one or more entities, such as a bank, that provide accounts to customers for conducting payment transactions, such as initiating credit and/or debit payments. For example, an issuer institution may provide an account identifier, such as a personal account number (PAN), to a customer that uniquely identifies one or more accounts associated with that customer. The account identifier may be embodied on a physical financial instrument, such as a payment card, and/or may be electronic and used for electronic payments. The terms "issuer institution," "issuer bank," and "issuer system" may also refer to one or more computer systems operated by or on behalf of an issuer institution, such as a server computer executing one or more software applications. For example, an issuer system may include one or more authorization servers for authorizing a payment transaction.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more databases such that they can be used to conduct a transaction without directly using the original account identifier. In some examples, an original account identifier, such as a PAN, may be associated with a plurality of tokens for different individuals or purposes. An issuer institution may be associated with a bank identification number (BIN) or other unique identifier that uniquely identifies it among other issuer institutions.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The term "client device," as used herein, refers to any electronic device that is configured to communicate with one or more servers or remote devices and/or systems. A client device may include a mobile device, a network-enabled appliance (e.g., a network-enabled television, refrigerator, thermostat, and/or the like), a computer, a POS system, and/or any other device or system capable of communicating with a network.

As used herein, the term "financial device" may refer to a payment device, an electronic payment device, a portable financial device, portable payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a mobile device executing an electronic wallet application, a personal digital assistant, a security card, an access card, a wireless terminal, and/or a transponder, as examples. The financial device may include a volatile or a non-volatile memory to store information, such as an account identifier or a name of the account holder. The financial device may store account credentials locally on the device, in digital or non-digital representation, or may facilitate accessing account credentials stored in a medium that is accessible by the financial device in a connected network.

As used herein, the term "server" may refer to or include one or more processors or computers, storage devices, or similar computer arrangements that are operated by or facilitate communication and processing for multiple parties in a network environment, such as the internet, although it will be appreciated that communication may be facilitated over one or more public or private network environments and that various other arrangements are possible. Further, multiple computers, e.g., servers, or other computerized devices, e.g., POS devices, directly or indirectly communicating in the network environment may constitute a "system," such as a merchant's POS system. Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

The term "account data," as used herein, refers to any data concerning one or more accounts for one or more users. Account data may include, for example, one or more account identifiers, user identifiers, transaction histories, balances, credit limits, issuer institution identifiers, and/or the like.

In some non-limiting embodiments or aspects of the present disclosure, the disclosure improves on prior art systems by determining queue lengths and wait times by using transaction data as an efficient proxy for direct observation. By collecting and analyzing historic transaction data and applying machine learning techniques, variables that influence the frequency, value, and timing of transactions can be extracted. Furthermore, by filtering the transaction data to analyze individual merchants, and applying modified queuing theory models, the described systems can generate useful metrics, communications, and feedback for users and merchants. Additional communication processes may be automated to allow users and/or merchants to be automatically notified if a wait time estimate is abnormally low or abnormally high, which further reduces reaction time, increases the likelihood of users and/or merchants taking action, and increases the effectiveness of user promotion campaigns or merchant service times. Additionally, the unique arrangement of network architecture described in non-limiting embodiments, including a combination or sub-combination of financial devices, POS terminals, transaction processing servers, and communication devices, allows the system to operate in real-time and create a feedback loop for recursive improvement.

With specific reference to FIG. 1, and in some non-limiting embodiments or aspects of the disclosure, provided is a system 100 for generating and applying a predictive wait time estimate using predictive modeling. In the system, one or more account holders 102 may interact with one or more merchants 104. Account holders 102 may complete transactions with merchants 104 by using a financial device 106 associated with their transaction account to make a payment for goods and/or services via a merchant's 104 (POS) terminal 108. The transaction requests may be received and processed by a transaction processing server 110 or system, which is communicatively connected to a transaction data database 112 for storing transaction data of transactions between account holders 102 and merchants 104. Transaction data may include, but is not limited to, transaction date, transaction time, merchant identification, merchant location, transaction value, and/or the like. The transaction processing server 110 may be communicatively connected to a predictive modeling server 114. It will also be appreciated that the transaction processing server 110 may be the same server as the predictive modeling server 114. The predictive modeling server 114 may communicate directly with the transaction data database 112 and/or the transaction processing server 110 to retrieve transaction data of completed transactions between account holders 102 and merchants 104. The predictive modeling server 114 may also be connected to a model database 116 where predictive models may be stored. It will be appreciated that other configurations are possible.

With further reference to FIG. 1, and in some non-limiting embodiments or aspects of the disclosure, users (e.g., prospective customers), which may include account holders 102 who have previously transacted with the merchants 104, may be provided with a user application programming interface (API) 118 to communicate with the predictive modeling server 114. Via the user API 118, a user may request predictive wait time data from the predictive modeling server 114, receive the predictive wait time data, and/or save preferences and settings associated with their user profile. Users may be presented with a list of one or more merchants 104 to select from, and the merchant list may be filtered based on geographic region, business hours, merchant type, good/service type, good/service price, proximity of the user, and/or the like. The predictive modeling server 114 may receive the merchant 104 selection and generate and/or transmit a predictive wait time estimate for the selected merchant 104 to the user. Merchants 104 may also be provided with a merchant API 120 to communicate with the predictive modeling server 114. Via the merchant API 120, a merchant 104 may request predictive wait time data from the predictive modeling server 114, receive the predictive wait time data, and/or save preferences and settings associated with their merchant 104 profile. The predictive modeling server 114 may use historic transaction data for one or more merchants 104 to create a predictive model of the arrival rates of customers at a given merchant 104, as well as to determine historic service rates of a given merchant 104. The predictive model is configured to have an output of arrival rate for an input of at least one or more time parameters. The predictive model may be generated specific to one merchant 104, a group of merchants 104 (e.g., merchants with similar characteristics, such as merchant type), or all merchants 104. It will be appreciated that other configurations are possible.

With further reference to FIG. 1, and in some non-limiting embodiments or aspects of the disclosure, the system 100 may include a communication server 122, which may be communicatively connected to the transaction processing server 110 and/or the predictive modeling server 114. It will also be appreciated that the communication server 122 may be the same server as the transaction processing server 110 and/or the predictive modeling server 114. The communication server 122, predictive modeling server 114, model database 116, transaction processing server 110, and transaction data database 112 may all be associated with and/or controlled by a transaction service provider 128. The communication server 122 is configured to communicate with user communication devices 124 and/or merchant communication devices 126. Communications from the communication server 122 may include data, messages, alerts, notifications, and/or the like related to predictive wait time estimates that are relevant to a user or merchant 104. In one non-limiting example, the communication server 122 may generate and transmit an alert to a merchant 104 including an alert that predictive wait time estimates and/or arrival rates for customers are meeting or exceeding a wait time and/or arrival rate threshold, such as a threshold set by the merchant 104 in their merchant profile, or a threshold automatically determined as a historic wait time and/or arrival rate maximum. By way of a further non-limiting example, the communication server 122 may generate and transmit an advertisement for one or more merchants 104 to one or more users. The advertisement may be triggered to be sent automatically by the communication server 122 based on one or more parameters, such as proximity of a user to the advertised merchant 104, low predictive wait time estimates and/or arrival rates, advertising campaign settings associated with a merchant 104 profile, and/or the like. It will be appreciated that by transmitting communications to users and merchants in ways that are intended to influence future transaction behavior, the system provides for recursive feedback. Customers are more likely to learn what times have the shortest queues, and so the unpredictability and variability of queue length and wait time will decrease. Merchants are more likely to react to periods where the service rate is unnecessarily fast or inefficiently slow, which further reduces unpredictability and variability in queue length and wait time. It will be appreciated that other configurations are possible.

Figure 2:
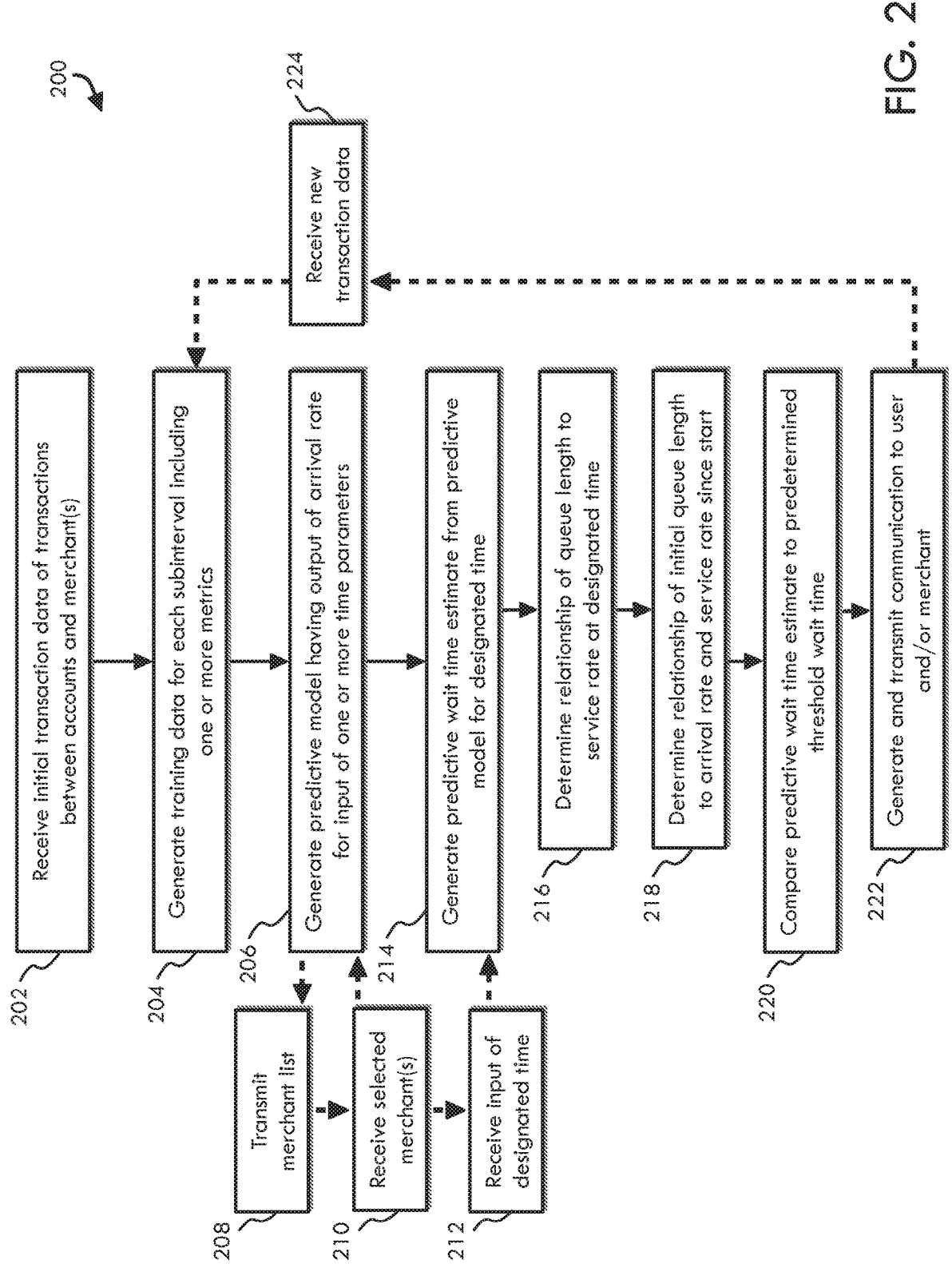
FIG. 2 is a flow diagram of some non-limiting embodiments or aspects of a system and method for generating and applying a predictive wait time estimate using predictive modeling.

With specific reference to FIG. 2, and in some non-limiting embodiments or aspects of the disclosure, provided is a method 200 for generating and applying a predictive wait time estimate using predictive modeling. The method 200 may be carried out by the communication server 122, predictive modeling server 114, transaction processing server 110, or any combination thereof. The method 200 includes, at step 202, receiving initial transaction data representative of a plurality of transactions between a plurality of transaction accounts and at least one merchant completed during a sample time period. The transaction data may include, but is not limited to, transaction date, transaction time, merchant identification, merchant location, transaction value, and/or the like. At step 204, training data is generated for each subinterval of the sample time period. Subintervals may be on the scale of one or more minutes, hours, days, weeks, months, seasons, or years. The training data may be generated based at least partially on the initial transaction data and include at least one of the following: service rate during the subinterval, number of transactions during the subinterval, total transaction value during the subinterval, mean transaction value during the subinterval, year, month, day of week, or any combination thereof. At step 206, based at least partially on the training data of the sample time period, a predictive model is generated that generates an output of arrival rate for an input including at least one time parameter, e.g., one or more subintervals. The predictive model may be generated specific to one or more merchants. At step 208, a list of one or more merchants may be transmitted to a user for selection. The merchant list may be generated or filtered based on one or more parameters, including geographic region, business hours, merchant type, good/service type, good/service price, proximity of the user, and/or the like. At step 210, a selection from the user of one or more merchants from the merchant list is received. At step 212, an input designated time may be received, which may be input to the predictive model to generate a predictive wait time estimate. The input designated time may be determined from a current time, a selected future time, or a future time that is determined from the current time plus travel time for the user from their current location to the merchant location. It will be appreciated that many configurations are possible.

With further reference to FIG. 2, and in some non-limiting embodiments or aspects of the disclosure, at step 214, using the predictive model, the predictive wait time is generated for the input designated time. The predictive wait time estimate may be at least partially based on the relationship of a queue length at the designated time to the service rate at the designated time, at step 216. Further, the queue length at the designated time may be determined at least partially by an initial queue length at a start time and differences in the arrival rate and the service rate for each subinterval from the start time to the designated time, at step 218. At step 220, the predictive wait time estimate may be compared to a predetermined threshold wait time. At step 222, based at least partially on the comparison of the predictive wait time estimate to the predetermined threshold wait time, a communication may be generated and transmitted to one or more users and/or one or more merchants. In a non-limiting example, the predetermined threshold wait time may be a minimum wait time, and a communication may be generated and transmitted to a user, when the predictive wait time is less than or equal to the minimum wait time, alerting the user to low wait times for a given merchant. By way of another non-limiting example, the predetermined wait threshold wait time may be a maximum wait time, and a communication may be generated and transmitted to the merchant for which predictive wait time is equal to or greater than the maximum wait time such that the merchant may take action to increase their corresponding service rate (e.g., activating another point of service, sending a communication to POS terminal operators, and/or the like). At step 224, new transaction data may be received, and the system may repeat steps 204-222 based on the new transaction data, such that the predictive model is improved and refined over time. It will be appreciated that many configurations are possible.

Predictive Model Formation and Application

In one non-limiting example, the predictive model for wait time estimation may be generated by using transaction data as a proxy for direct observation. As a basis for generating the predictive model, let $\mu$ denote service rate, let $\lambda$ denote arrival rate, let $\rho$ denote queue length, and let $\rho_0$ denote queue length at the start of the interval. Normal queue behavior, therefore, may be represented by the following formula:

$$\Delta\rho = \lambda - \mu \qquad \text{Formula 1}$$

which shows that the change in queue length in an interval may be determined by the arrival rate minus the service rate. Thus, at any given interval unit (e.g., minute) n, we can represent queue length by the following formula:

$$\rho = \rho_0 + \sum_0^{n-1} \Delta\rho \qquad \text{Formula 2}$$

which shows that queue length may be determined by the starting queue length plus every change in queue length in each interval since the start. In many models, the starting queue length may be zero to represent a merchant's initial queue length when starting a business day. Thus, the wait time W after time n may be represented by the following formula:

$$W = \frac{\sum_0^{n-1} \frac{\rho}{\mu}}{n} \qquad \text{Formula 3}$$

which shows that wait time may be determined by the sum of each interval's queue length divided by service rate, divided by the total time. In effect, it is the mean wait time over all intervals.

In one non-limiting example, financial transaction data over a sample period of twelve months may be collected for creation of a training data set for a generated predictive model, e.g., machine learning algorithm. In a system managed by a transaction service provider, the financial transaction data may be stored in a transaction data database after being processed by a transaction processing server. Raw transaction data may include information such as transaction date, transaction time, merchant identification, merchant location, transaction value, and/or the like. The raw transaction data may be processed to generate training data and test feature vectors. Each feature vector includes fields such as service rate, day of the week, time of day, number of transactions in subinterval (e.g., minute), number of transactions in prior subinterval, value of transactions in subinterval, value of transactions in prior subinterval, mean amount spent per customer at merchant, and/or the like. Day of the week may be directly determined from transaction date and time of day may be determined from transaction time. Number of transactions in the subinterval may be determined from the number of transactions with a transaction date and transaction time that fall within the subinterval. Number of transactions in a prior subinterval may be determined from the number of transactions with a transaction date and transaction time that fall within the prior subinterval. Value of transactions in a subinterval may be determined from the total transaction value of all transactions with a transaction date and transaction time that fall within the subinterval. Value of transactions in a prior subinterval may be determined from the total transaction value of all transactions with a transaction date and transaction time that fall within the prior subinterval. Mean amount spent per customer at a merchant may be determined from the total transaction value divided by the number of unique transaction accounts for all transactions for the given merchant. These fields of the feature vector form the independent variables of the training data. It will be appreciated that many configurations are possible.

To generate a complete training data set for training of the predictive model (e.g., a machine learning model), a training label set must be generated. The predictive model may be a linear regression model, for example, in which case the data set of feature vectors serve as the input for the linear regression model, and arrival rate may be the output of the linear regression model. Generation of the training label set includes generating the dependent variable data, which is arrival rate. For estimating these training labels, an arrival estimation model may be used, such as a modified Pareto distribution model. In this non-limiting example, if n denotes the optimum queue length at a given time, and t is the amount of time it takes for a queue of length n to form, then by applying the modified Pareto distribution, we can say that half of the queue size n/2 builds up during the square root of the time interval $\sqrt{t}$. This may then be used to model the arrival rates. A modified Pareto distribution provides an improved fit for modeling arrival rates, as most customers join the queue in the first fraction of the line growth, and thereafter the number of new arrivals continues to decrease until queue length becomes smaller again. This is because people have a tendency to be drawn to a queue where wait time and/or queue length is small. Thus, more people join the queue when it is small, but once the wait time and/or queue length has become considerable, people hesitate to join the queue. In some circumstances, some people may even abandon the queue if the wait time is too great. Once the queue length decreases again, either through service or abandonments, the number of new people joining the queue with begin to increase once more. Repeating this cycle results in predictive model fluctuations that more accurately matches real human behavior.

In view the above, generation of the predictive model may include determination of the service rate. The service rate may be represented as the number of people serviced per unit time (e.g., service per minute). In one non-limiting example, the service rate may be determined by directly calculating the number of transactions in a minute. According to another non-limiting example, the service rate may be determined by dividing the total value of transactions in an interval (e.g., minute) by the average (e.g., mean, median, mode) cost per person for a given merchant, which provides an approximate number of people served in the interval. This may be combined with averaging these approximations over a number of intervals (e.g., five minutes) to reduce variance. Finally, if the sample data is known to capture only a section of the entire population of transaction accounts, such as only capturing transaction accounts affiliated with a given transaction service provider, then the wait time for the entire population may be estimated by scaling the estimate based on the transactions service provider's market share. For example, if the transaction service provider's processed transactions account for 70% of all financial transactions, the estimated number of transactions completed per time interval may be scaled up by dividing by 0.70.

Figure 3:
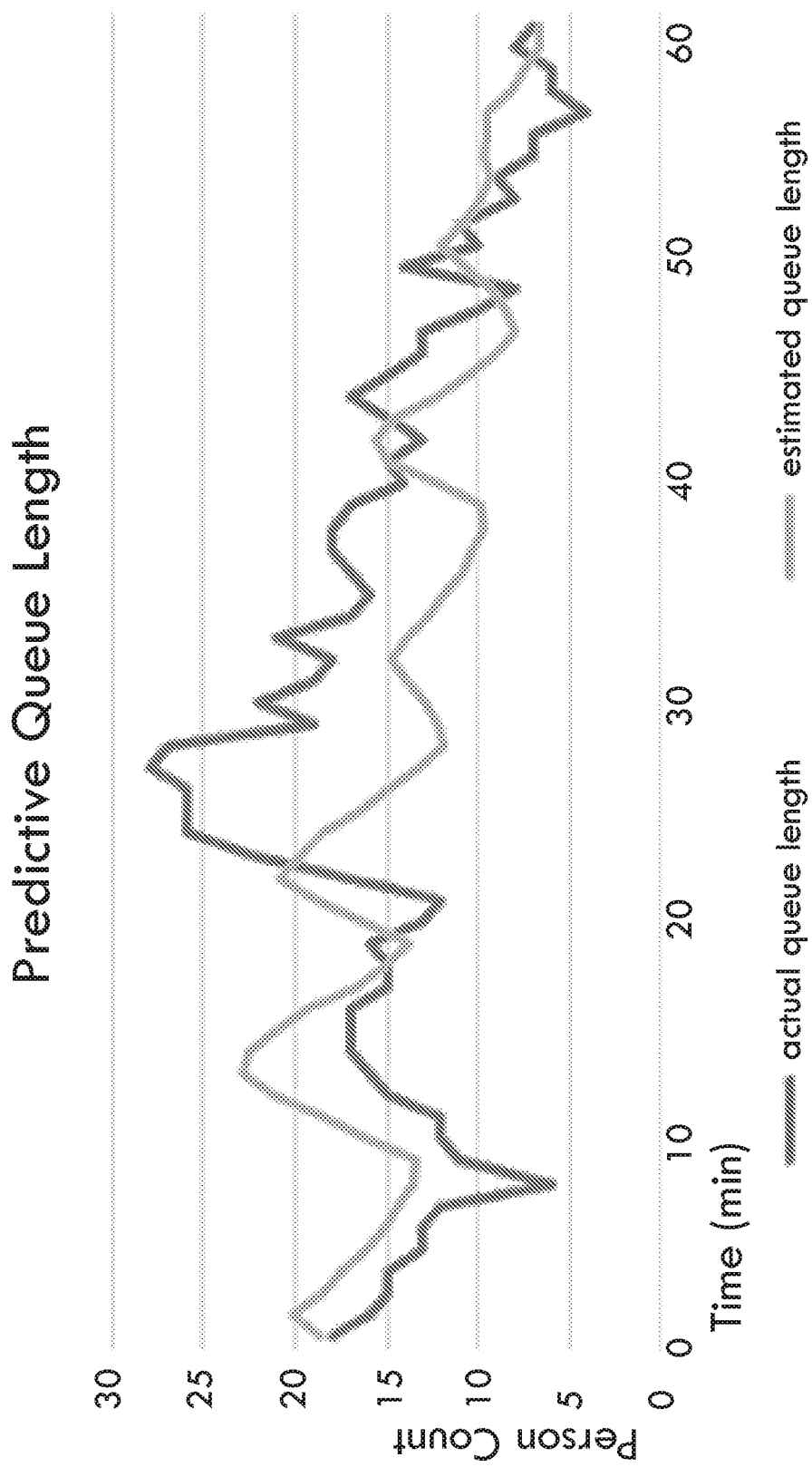
FIG. 3 is a performance output diagram of some non-limiting embodiments or aspects of a system and method generating and applying a predictive wait time estimate using predictive modeling.
Figure 4:
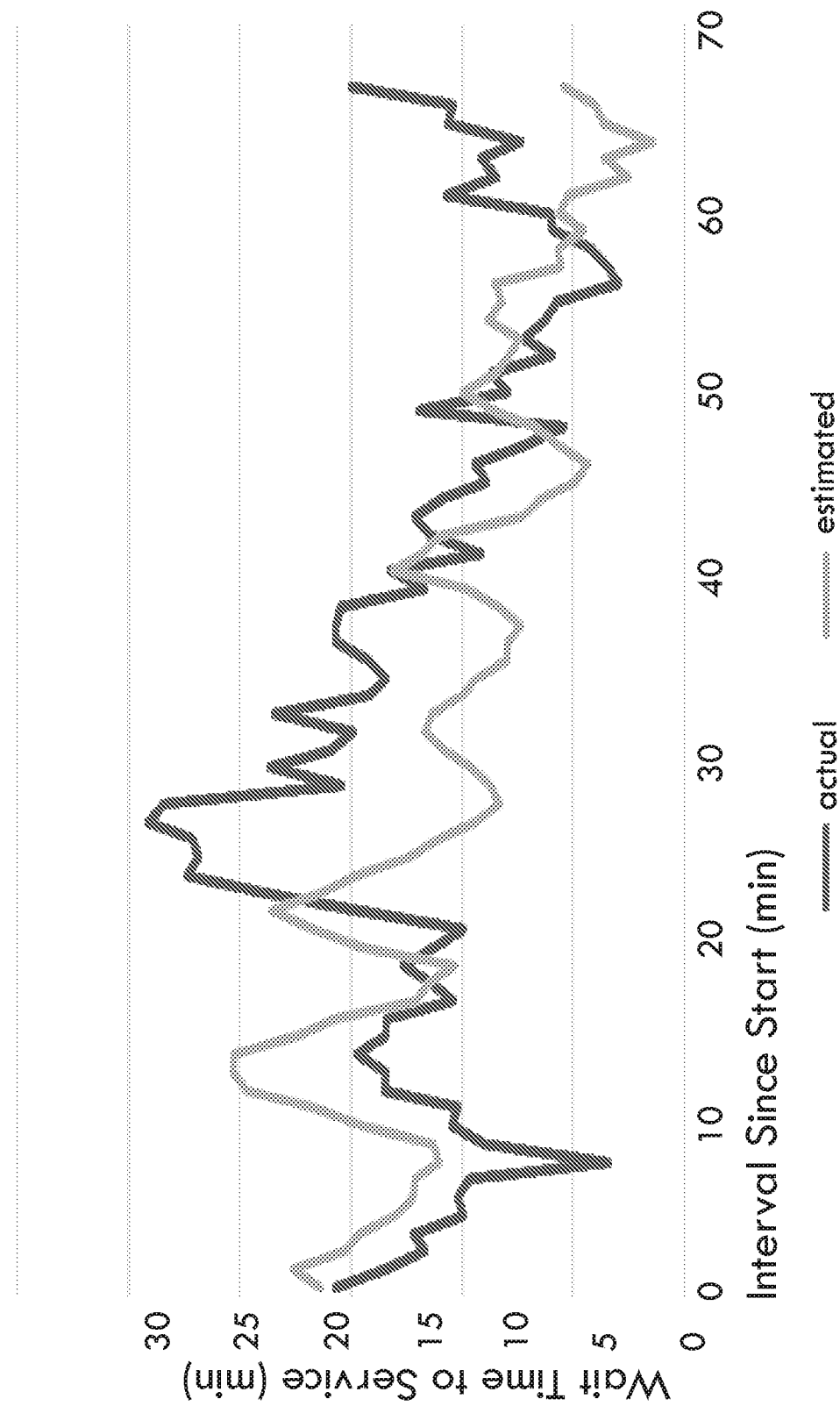
FIG. 4 is a performance output diagram of some non-limiting embodiments or aspects of a system and method generating and applying a predictive wait time estimate using predictive modeling.

The above arrival estimation model in combination with the above service rate estimation process may be used to generate the predictive model, e.g., linear regression model. For generating a predictive wait time for a future designated time, a test feature vector (input) is prepared that best approximates what conditions will be like at the future designated time. Because historic transaction data has already been collected, a feature vector can be generated based on transactions occurring in the same weekday, same month, same week of the month, and/or the like. Exemplary output of the application of a linear regression predictive model to test transaction data, using the above methods of deriving arrival rate and service rate, are shown in FIGS. 3 and 4. FIG. 3 depicts predictive queue length, determined by Formulas 1 and 2, shown above. As depicted, the described methods herein produce a lesser variance estimation of queue length that is highly correlated with actual queue length. Moreover, FIG. 4 depicts predictive wait time, which is the ultimate output of the predictive model and the result of Formula 3, shown above. As depicted, the described methods herein produce a lesser variance estimation of wait time that is highly correlated with actual wait time. It will be appreciated that other configurations are possible.

Although the disclosure has been described in detail for the purpose of illustration based on what is currently considered to be the most practical and preferred and non-limiting embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A computer-implemented method for generating and applying a predictive wait time estimate using predictive modeling, the method comprising:

receiving, with at least one processor, initial transaction data representative of a plurality of transactions between a plurality of transaction accounts and at least one merchant completed during a sample time period, the initial transaction data comprising, for each transaction of the plurality of transactions, a transaction time and a transaction value;

generating, with at least one processor and based at least partially on the initial transaction data, for each subinterval of a first plurality of subintervals of the sample time period, training data comprising at least one of the following: service rate during the subinterval, number of transactions during the subinterval, total transaction value during the subinterval, mean transaction value during the subinterval, year, month, day of week, or any combination thereof;

generating, with at least one processor and based at least partially on the training data of the sample time period, a predictive model that generates an output of arrival rate for an input comprising at least one time parameter;

generating, with at least one processor and using the predictive model, the predictive wait time estimate for a designated time, wherein generating the predictive wait time estimate comprises:

determining an initial queue length at a start time preceding the designated time;

determining a service rate for each subinterval of a second plurality of subintervals from the start time to the designated time based on transactions processed over time to produce a plurality of service rates;

determining an arrival rate for each subinterval of the second plurality of subintervals from the start time to the designated time using the predictive model to produce a plurality of arrival rates;

determining a difference between an arrival rate of the plurality of arrival rates and a service rate of the plurality of services rates for each subinterval of the second plurality of subintervals, to produce a plurality of changes in queue length for each subinterval of the second plurality of subintervals;

determining a queue length at the designated time based on the initial queue length and the plurality of changes in queue length; and generating the predictive wait time estimate based on the queue length at the designated time and a service rate at the designated time;

receiving at predetermined intervals, with at least one processor, new transaction data representative of one or more transactions between one or more accounts and the at least one merchant completed during a new sample time period, the new transaction data comprising, for each transaction of the one or more transactions, a transaction time and a transaction value; and in response to receiving the new transaction data at each predetermined interval of the predetermined intervals:

generating, with at least one processor, new training data based at least partially on the new transaction data;

generating, with at least one processor, a new predictive model based at least partially on the new training data; and generating, with at least one processor, a new predictive wait time estimate using the new predictive model.

2. The method of claim 1, further comprising:

receiving, with at least one processor, input of the designated time from a display device of a transaction account holder or a merchant; and in response to receiving the input of the designated time, transmitting, with at least one processor, the generated predictive wait time estimate to the display device for presentation.

3. The method of claim 2, further comprising:

transmitting to the display device, with at least one processor, a plurality of merchants comprising the at least one merchant for presentation and selection; and receiving, with at least one processor, from the display device a selection of the at least one merchant.

4. The method of claim 1, wherein the designated time is a current time, the method further comprising:

receiving, with at least one processor, new transaction data representative of one or more transactions between one or more transaction accounts and the at least one merchant completed during a time interval preceding up to the current time, the new transaction data comprising, for each transaction of the one or more transactions, a transaction time and a transaction value; and generating, with at least one processor, the service rate at the designated time based at least partially on a relationship of a total transaction value during the time interval preceding up to the current time to a mean transaction value for the time interval preceding up to the current time.

5. The method of claim 1, further comprising, in response to determining that the predictive wait time estimate is greater than or equal to a predetermined threshold wait time for the at least one merchant, generating and transmitting, with at least one processor, a communication to at least one transaction account holder comprising an offer for a reduced service or product price for the at least one merchant.

6. The method of claim 1, further comprising, in response to determining that the predictive wait time estimate is greater than or equal to a predetermined threshold wait time for the at least one merchant, generating and transmitting, with at least one processor, a communication to at least one merchant system comprising an alert configured to cause the at least one merchant system to take action to increase its corresponding service rate.

7. The method of claim 1, further comprising, in response to determining that the predictive wait time estimate is less than or equal to a predetermined minimum wait time for the at least one merchant, generating and transmitting, with at least one processor, a communication to at least one transaction account holder comprising an advertisement for the at least one merchant.

8. A system for generating and applying a predictive wait time estimate using predictive modeling, the system comprising at least one server computer including at least one processor, the at least one server computer programmed and/or configured to:

receive initial transaction data representative of a plurality of transactions between a plurality of transaction accounts and at least one merchant completed during a sample time period, the initial transaction data comprising, for each transaction of the plurality of transactions, a transaction time and a transaction value;

generate, based at least partially on the initial transaction data, for each subinterval of a first plurality of subintervals of the sample time period, training data comprising at least one of the following: service rate during the subinterval, number of transactions during the subinterval, total transaction value during the subinterval, mean transaction value during the subinterval, year, month, day of week, or any combination thereof;

generate, based at least partially on the training data of the sample time period, a predictive model that generates an output of arrival rate for an input comprising at least one time parameter;

generate, using the predictive model, the predictive wait time estimate for a designated time, wherein, when generating the predictive wait time estimate, the at least one server computer is programmed and/or configured to:

determine an initial queue length at a start time preceding the designated time;

determine a service rate for each subinterval of a second plurality of subintervals from the start time to the designated time based on transactions processed over time to produce a plurality of service rates;

determine an arrival rate for each subinterval of the second plurality of subintervals from the start time to the designated time using the predictive model to produce a plurality of arrival rates;

determine a difference between an arrival rate of the plurality of arrival rates and a service rate of the plurality of services rates for each subinterval of the second plurality of subintervals, to produce a plurality of changes in queue length for each subinterval of the second plurality of subintervals;

determine a queue length at the designated time based on the initial queue length and the plurality of changes in queue length; and generate the predictive wait time estimate based on the queue length at the designated time and a service rate at the designated time;

receive, at predetermined intervals, new transaction data representative of one or more transactions between one or more transaction accounts and the at least one merchant completed during a new sample time period, the new transaction data comprising, for each transaction of the one or more transactions, a transaction time and a transaction value; and in response to receiving the new transaction data at each predetermined interval of the predetermined intervals:
generate new training data based at least partially on the new transaction data;
generate a new predictive model based at least partially on the new training data; and
generate a new predictive wait time estimate using the new predictive model.

9. The system of claim 8, the at least one server computer further programmed and/or configured to:
receive input of the designated time from a display device of a transaction account holder or a merchant; and
in response to receiving the input of the designated time, transmit the generated predictive wait time estimate to the display device for presentation.

10. The system of claim 9, the at least one server computer further programmed and/or configured to:
transmit to the display device a plurality of merchants comprising the at least one merchant for presentation and selection; and
receive from the display device a selection of the at least one merchant.

11. The system of claim 8, wherein the designated time is a current time, the at least one server computer further programmed and/or configured to:
receive new transaction data representative of one or more transactions between one or more transaction accounts and the at least one merchant completed during a time interval preceding up to the current time, the new transaction data comprising, for each transaction of the one or more transactions, a transaction time and a transaction value; and
generate the service rate at the designated time based at least partially on a relationship of a total transaction value during the time interval preceding up to the current time to a mean transaction value for the time interval preceding up to the current time.

12. The system of claim 8, the at least one server computer further programmed and/or configured to, in response to determining that the predictive wait time estimate is greater than or equal to a predetermined threshold wait time for the at least one merchant, generate and transmit a communication to at least one transaction account holder comprising an offer for a reduced service or product price for the at least one merchant.

13. The system of claim 8, the at least one server computer further programmed and/or configured to, in response to determining that the predictive wait time estimate is greater than or equal to a predetermined threshold wait time for the at least one merchant, generate and transmit a communication to at least one merchant system comprising an alert configured to cause the at least one merchant system to take action to increase its corresponding service rate.

14. The system of claim 8, the at least one server computer further programmed and/or configured to, in response to determining that the predictive wait time estimate is less than or equal to a predetermined minimum wait time for the at least one merchant, generate and transmit a communication to at least one transaction account holder comprising an advertisement for the at least one merchant.

15. A computer program product for generating and applying a predictive wait time estimate using predictive modeling, the computer program product comprising at least one non-transitory computer-readable medium including program instructions that, when executed by at least one processor, cause the at least one processor to:
receive initial transaction data representative of a plurality of transactions between a plurality of transaction accounts and at least one merchant completed during a sample time period, the initial transaction data comprising, for each transaction of the plurality of transactions, a transaction time and a transaction value;
generate, based at least partially on the initial transaction data, for each subinterval of a first plurality of subintervals of the sample time period, training data comprising at least one of the following: service rate during the subinterval, number of transactions during the subinterval, total transaction value during the subinterval, mean transaction value during the subinterval, year, month, day of week, or any combination thereof;
generate, based at least partially on the training data of the sample time period, a predictive model that generates an output of arrival rate for an input comprising at least one time parameter; and
generate, using the predictive model, the predictive wait time estimate for a designated time, wherein the program instructions that cause the at least one processor to generate the predictive wait time estimate cause the at least one processor to:

determine an initial queue length at a start time preceding the designated time;

determine a service rate for each subinterval of a second plurality of subintervals from the start time to the designated time based on transactions processed over time to produce a plurality of service rates;

determine an arrival rate for each subinterval of the second plurality of subintervals from the start time to the designated time using the predictive model to produce a plurality of arrival rates;

determine a difference between an arrival rate of the plurality of arrival rates and a service rate of the plurality of services rates for each subinterval of the second plurality of subintervals, to produce a plurality of changes in queue length for each subinterval of the second plurality of subintervals;

determine a queue length at the designated time based on the initial queue length and the plurality of changes in queue length; and generate the predictive wait time estimate based on the queue length at the designated time and a service rate at the designated time;

receive, at predetermined intervals, new transaction data representative of one or more transactions between one or more transaction accounts and the at least one merchant completed during a new sample time period, the new transaction data comprising, for each transaction of the one or more transactions, a transaction time and a transaction value; and in response to receiving the new transaction data at each predetermined interval of the predetermined intervals:
generate new training data based at least partially on the new transaction data;
generate a new predictive model based at least partially on the new training data; and
generate a new predictive wait time estimate using the new predictive model.

16. The computer program product of claim 15, wherein the program instructions further cause the at least one processor to:
receive input of the designated time from a display device of a transaction account holder or a merchant; and
in response to receiving the input of the designated time, transmit the generated predictive wait time estimate to the display device for presentation.

17. The computer program product of claim 16, wherein the program instructions further cause the at least one processor to:
transmit to the display device a plurality of merchants comprising the at least one merchant for presentation and selection; and
receive from the display device a selection of the at least one merchant.

18. The computer program product of claim 15, wherein the designated time is a current time, and wherein the program instructions further cause the at least one processor to:
receive new transaction data representative of one or more transactions between one or more transaction accounts and the at least one merchant completed during a time interval preceding up to the current time, the new transaction data comprising, for each transaction of the one or more transactions, a transaction time and a transaction value; and
generate the service rate at the designated time based at least partially on a relationship of a total transaction value during the time interval preceding up to the current time to a mean transaction value for the time interval preceding up to the current time.

* * * * *